Dec. 18, 1945.  H. B. MUSTER  2,391,031
SHEET METAL NUT
Filed Sept. 23, 1944  2 Sheets-Sheet 1

INVENTOR.
Harold B. Muster
BY
Hyde and Meyer
ATTORNEYS.

Dec. 18, 1945. H. B. MUSTER 2,391,031
SHEET METAL NUT
Filed Sept. 23, 1944 2 Sheets-Sheet 2

INVENTOR.
Harold B. Muster
BY
Hyde and Meyer
ATTORNEYS.

Patented Dec. 18, 1945

2,391,031

UNITED STATES PATENT OFFICE 2,391,031

SHEET METAL NUT

Harold B. Muster, Avon Lake, Ohio, assignor to Rudolph I. Schonitzer, Shaker Heights, Ohio Application September 23, 1944, Serial No. 555,429

17 Claims. (Cl. 85—32)

This invention relates to improvements in sheet metal nuts, the invention having for one of its objects the provision of a nut which comprises two simple and inexpensive sheet metal members capable of being readily assembled in telescopic and interlocked relationship, the interlocking of said members effectively preventing relative rotary movement thereof.

A further object of the present invention is the provision of a sheet metal nut having improved means by which it may be readily turned in its application to and its removal from a bolt or other threaded part.

A further object of the present invention is the provision of a sheet metal nut in which the turning means thereof is a part of the means by which the two sheet metal members comprising the nut are interlocked against relative rotary movement.

A further object of the present invention is the provision of a sheet metal nut in which one of the sheet metal members thereof is provided with circumferentially spaced projections which are interlocked with correspondingly spaced parts of the other sheet metal member to prevent relative rotary movement of such members, and in which said interlocking projections are outwardly extended to provide nut-turning fingers.

A further object of the present invention is the provision of a sheet metal nut which is characterized by its structural simplicity, the ease of assembly and the interlocking of its two sheet metal members, and its rugged and durable nature.

Further objects of the present invention, and many of its practical advantages, will be referred to in, or will be evident from, the following description of two embodiments of such invention, as illustrated in the accompanying drawings, in which Fig. 1 is a plan view of one form of sheet metal nut embodying the present invention;

Fig. 2 is a side elevational view thereof;

Figs. 3 and 4 are diametric sectional views, on the lines 3—3 and 4—4 of Fig. 1, respectively;

Figure 7:
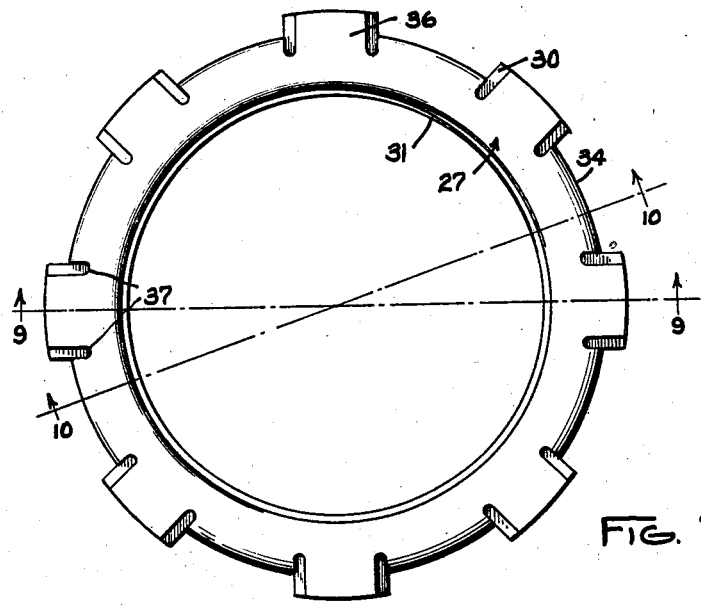
Fig. 7 is a plan view of another form of sheet metal nut embodying the present invention.
Figure 8:
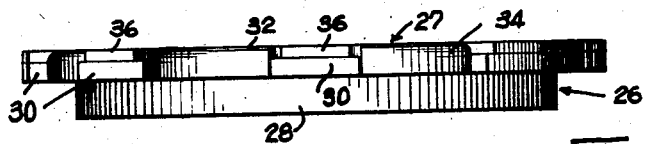
Fig. 8 is a side elevational view of the nut of Fig. 7.
Figure 9:
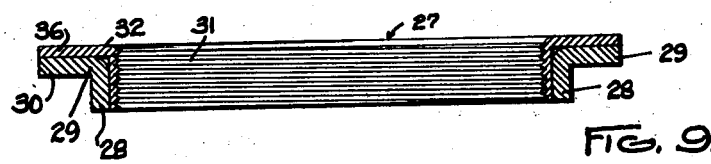
Figure 10:
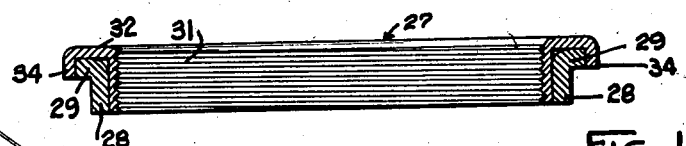
Figure 11:
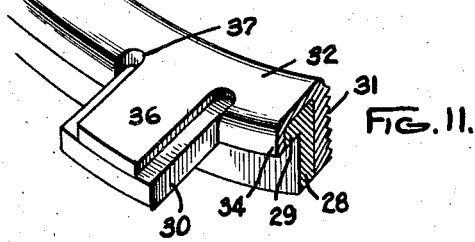

Figs. 9 and 10 are diametric sectional views of the nut of Fig. 7, on the lines 9—9 and 10—10 of Fig. 7, respectively; and Fig. 11 is a fragmentary perspective view of the nut of Fig. 7.

Before explaining in detail the nuts here illustrated, it is to be understood that the invention here involved is not limited to the structural details or the arrangement of parts here shown, as nuts embodying the present invention obviously may take other forms. Also, it is to be understood that the phraseology or terminology herein employed is for the purpose of description and not of limitation, the scope of the present invention being denoted by the appended claims.

Referring first to the nut of Figs. 1 to 4 inclusive, it will be noted that such nut comprises a pair of telescopically related sheet metal members 10 and 11 capable of being rapidly and inexpensively made by simple stamping and forming operations. The inner member 10 consists of an internally threaded tubular portion 12 and an outwardly turned portion 13, the latter portion being here shown as of annular form in plan view and disposed at the upper end of the tubular portion 12. The outer nut member 11 consists of upper and lower tubular portions 15 and 16, with a transverse shoulder 17 therebetween, the lower tubular portion 16 having a press fit connection with the internally threaded tubular portion 12 of the inner nut member 10 and the upper tubular portion 15 being spaced from said inner tubular portion by the width of the intermediate shoulder 17.

Figure 1:
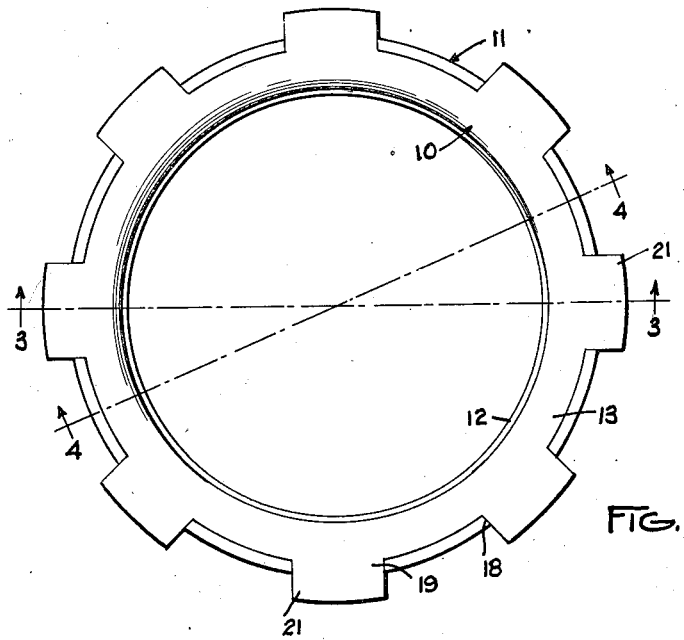
Figure 2:
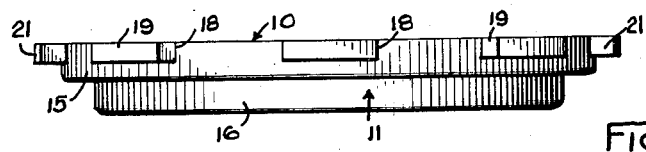
Figure 3:
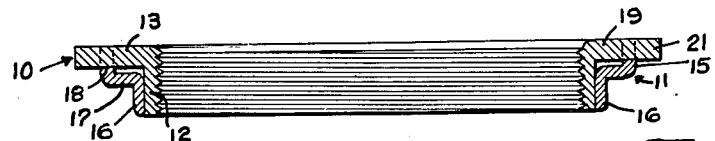
Figure 4:
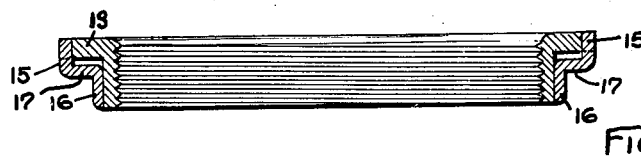

As will be evident from Figs. 1 and 4, the upper tubular portion 15 of the outer sheet metal member 11 is of such size as to receive the outwardly turned top portion 13 of the inner sheet metal member 10, there preferably being a press fit connection of such portions, as here shown. In order to effectively prevent relative rotary movement of members 10 and 11, the top edge of the upper tubular portion 15 of the outer member 11 is provided with a series of circumferentially spaced notches 18, for the reception of correspondingly spaced interlocking projections 19 which extend radially outwardly from the outer edge of the annular top portion 13 of the inner member 10, there being eight sets of such interlocking notches and projections in this particular nut. As best shown in Figs. 1 and 3, the projections 19 of the inner sheet metal member 10 snugly fit within the notches 18 of the outer sheet metal member 11, the depth of such notches corresponding with the thickness of said projections so that the nut has a smooth, flat top surface.

To enable the nut formed by the sheet metal members 10 and 11 to be readily turned in its application to and its removal from a bolt or other threaded part, the interlocking projections 19 of the inner member are extended outwardly beyond the upper tubular portion 15 of the outer member, and the extended portions 21 of such projections therefore provide circumferentially spaced turning fingers for the nut. The projections of the inner member 10 are thus made to serve, in a simple and effective manner, the dual function of interlocking the inner member of the nut with the outer member thereof and in providing turning fingers for the nut, as will be readily understood. The use of wrench-receiving apertures or separate turning pins is thus wholly unnecessary.

The interlocking of members 10 and 11 can be effected, of course, as they are endwise assembled, it merely being necessary that the notches 18 of the outer member and the projections 19 of the inner member be in registry as the members are endwise assembled in telescopic relationship. When the projections are seated in the notches, relative rotary movement of the two members of the nut is effectively prevented, the two members turning as a unit upon the application of a turning force applied to the outwardly projecting end portions 21 of the projections 19 of the inner member. Moreover, as the nut is tightened upon the work, with the work engaged by the intermediate shoulder 17 of the outer member 11, the projections 19 will seat in the notches 18 with increasing firmness, as will be readily understood.

Figure 5:
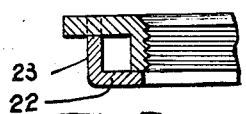
Fig. 5 is a fragmentary sectional view, corresponding to Fig. 3 and illustrating a slightly modified form which the nut of Fig. 1 may take.

If desired, of course, the work-engaging surface of the nut may be located at the bottom thereof, as in the modified form of Fig. 5. There, the outer sheet metal member of the nut is provided at its lower end with an inwardly turned annular portion 22, the inner edge of which underlies the lower edge of the internally threaded tubular portion of the inner sheet metal member (the construction of the latter member being identical with that of the inner member 10 of the nut of Figs. 1 to 4 inclusive. Extending upwardly from the outer edge of the inwardly turned annular portion 22 of the outer member of the nut of Fig. 5 is a tubular portion 23, which constitutes the side wall of the nut and which is circumferentially notched in its upper edge to receive the interlocking projections of the top portion of the inner nut member. As before, the interlocking projections are extended beyond the outer member of the nut to provide nut-turning fingers.

In the nut of Figs. 1 to 4 inclusive, the work-engaging shoulder 17 of the outer nut member is spaced from the top portion 13 of the inner nut member. However, if desired, such shoulder may be in planar contact with said top portion, as in Fig. 6, wherein the work-engaging shoulder 24 is in planar contact with the annular top portion of the inner nut member (a member identical with the member 10 of the nut of Figs. 1 to 4 inclusive). If desired and as shown, the lower tubular portion of the outer member of the nut of Fig. 6 may have an inturned bottom flange 25 underlying and in contact with the lower end of the internally threaded tubular portion of the inner nut member. As before, the interlocking projections of said inner nut member are extended outwardly beyond the outer nut member to provide nut-turning fingers.

Referring now to Figs. 7 to 11 inclusive, wherein is illustrated another embodiment of the present invention, it will be noted that the nut there shown also comprises two telescopically related sheet metal members, interlocked against relative rotary movement, with the interlocking projections extended outwardly to provide circumferentially spaced nut-turning fingers.

The outer sheet metal member 26 of this nut consists of a tubular portion 28 and an outwardly turned portion 29, the latter portion being of annular form and being located at the upper end of the tubular portion 28. At its outer edge, the top portion 29 is provided with a series of circumferentially spaced, outwardly extending projections 30, there being eight such projections in the embodiment here shown.

The inner sheet metal member 27 of this nut consists of an internally threaded tubular portion 31, having a press fit within the tubular portion 28 of the outer member, and an outwardly turned portion 32 overlying and in planar contact with the correspondingly turned top portion 29 of the outer member 26. Like such latter portion 29, the outwardly turned portion 32 of the inner member is of annular form and disposed at the upper end of its tubular portion, as shown.

To effectively prevent relative rotary movement of the inner and outer sheet metal members of this nut, the outwardly turned top portion 32 of the inner member 27 is provided at its outer edge with a series of circumferentially spaced depending arcuate flanges 34 which cooperate or coact with the outwardly extending projections 30 of the outer member 26 in interlocking the two members against relative rotary movement. As will be evident from the accompanying drawings, there is a depending flange 34 between each two adjacent projections 30, the length of each flange being such that its end edges engage the two projections between which it is disposed. As best shown in Fig. 10, the inner surfaces of the flanges 34 engage and cover, between the projections 30, the outer edges of the annular top portion 29 of the outer member 26, the depth of such flanges preferably being coincident with the thickness of said top portion.

If desired and as here shown, the top portion 32 of the inner member 27 may be provided, between its circumferentially spaced depending flanges 34, with outwardly extending projections 36 which overlie and rest upon the projections 30 of the outer member 26. For ease and simplicity of manufacture, the inner nut member 27 may be, and it here is, provided with slots 37 between those portions thereof which constitute its flanges 34 and those portions thereof which constitute its projections 36, the inner ends of such slots terminating inwardly of the flanges 34, as here shown. As a consequence, the projections 36 are of less width than that of the underlying projections 30 which are engaged by the flanges 34 for the interlocking of the inner and outer nut members.

It will thus be evident that in the nut of Figs. 7 to 11, the projections 30 of the outer sheet metal member 26 not only function, by their contact with the depending flanges 34 of the inner sheet member 27, to interlock the two members of the nut but also, provide turning fingers for the nut— the turning fingers being re-enforced, in the embodiment shown, by the projections 36 of the inner member 27.

Figure 6:
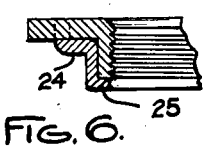
Fig. 6 is a fragmentary sectional view similar to Fig. 5 and illustrating another slightly modified form which the nut of Fig. 1 may take.

If desired, of course, the tubular portion 28 of the other nut member may be provided at its lower end with an inturned flange underlying the lower edge of the internally threaded tubular portion 31 of the inner sheet metal member, as in Fig. 6.

From the foregoing, it is evident that the nuts here illustrated are of simple, inexpensive and durable form, with the two sheet metal members of each nut capable of manufacture at low cost and capable of ready and convenient assembly in telescopic, interlocked relationship. The interlocking projections of the nuts provide convenient turning fingers therefor so that the use of wrench-receiving apertures or separate turning pins is wholly unnecessary.

To those skilled in the art to which the present invention relates, other features and advantages of sheet metal nuts embodying such invention will be obvious.

I claim:

1. A sheet metal nut, comprising a pair of sheet metal members having telescopically related inter-engaging tubular portions, the inner tubular portion being internally threaded, one of said members having outwardly extending projections providing turning fingers for the nut, and the other of said members having means cooperating with said projections in interlocking the two members against relative rotary movement.

2. A sheet metal nut, comprising a pair of sheet metal members having telescopically related tubular portions, the inner portion having a press fit connection within the outer portion and being internally threaded, one of said members having a series of circumferentially spaced outwardly extending projections providing nut-turning fingers, and the other of said members having integral means cooperating with said projections in interlocking the two members against relative rotary movement.

3. A sheet metal nut, comprising a pair of sheet metal members having telescopically related inter-engaging tubular portions and overlapping portions extending outwardly from their tubular portions, the inner tubular portion being internally threaded, the outwardly extending portion of one of said members being provided with outwardly extending projections providing nut-turning fingers, and the outwardly extending portion of the other of said members having parts interlocked with said projections to prevent relative rotary movement of said members.

4. A sheet metal nut, comprising a pair of sheet metal members having telescopically related tubular portions and annular overlapping portions extending outwardly from their tubular portions, the inner tubular portion being internally threaded and having a press fit within the outer tubular portion, the annular outwardly extending portion of one of said members being provided at its outer edge with a series of circumferentially spaced outwardly extending integral projections providing nut-turning fingers, and the annular outwardly extending portion of the other of said members being provided at its outer edge with correspondingly spaced integral parts interlocked with said projections to prevent relative rotary movement of said members.

5. A sheet metal nut, comprising a pair of sheet metal members having telescopically related inter-engaging tubular portions and overlapping portions extending outwardly from their tubular portions, the inner tubular portion being internally threaded, the outwardly extending portion of one of said members having outwardly extending projections providing nut-turning fingers, and the outwardly extending portion of the other of said members having flanges cooperating with said projections in interlocking the two members against relative rotary movement.

6. A sheet metal nut, comprising a pair of sheet metal members having telescopically related inter-engaging tubular portions and overlapping portions extending outwardly from their tubular portions, the inner tubular portion being internally threaded, the outwardly extending portion of one of said members having a series of circumferentially spaced outwardly extending integral projections providing nut-turning fingers, and the outwardly extending portion of the other of said members having a series of circumferentially spaced flanges, said flanges being interlocked with said projections to prevent relative rotary movement of said members.

7. A sheet metal nut, comprising a pair of sheet metal members having telescopically related inter-engaging parts and overlapping portions extending outwardly from such parts, the inner part being of tubular form and being internally threaded, the outwardly extending portions of said member having interlocked flanges and projections whereby relative rotary movement of said members is prevented, the projections extending outwardly beyond said flanges to provide turning-fingers for the nut.

8. A sheet metal nut, comprising a pair of sheet metal members having telescopically related inter-engaging parts and overlapping portions extending outwardly from such parts, the inner part being of tubular form and being internally threaded, the outwardly extending portions of said members being in planar contact and having interlocked elements which prevent relative rotary movement of said members, the interlocking elements of one of said members comprising projections extending outwardly beyond the other member to provide turning fingers for the nut.

9. A sheet metal nut, comprising a pair of sheet metal members having telescopically related inter-engaging parts and overlapping portions extending outwardly from such parts, the inner part being of tubular form and internally threaded, the lower one of the outwardly extending portions having circumferentially spaced outwardly extending projections providing nut-turning fingers, and the upper one of the overlapping outwardly extending portions being provided with depending flanges extending between and engaging said projections to interlock the two members against relative rotary movement.

10. A sheet metal nut, comprising inner and outer sheet metal members, the inner member having an internally threaded tubular portion and an outwardly extending portion, the other member having a tubular portion surrounding and in contact with the tubular portion of the inner member, the outer member also having an outwardly extending portion underlying the outwardly extending portion of the inner member and provided at its outer edge with a series of circumferentially spaced outwardly extending projections, the outwardly extending portion of the inner member being provided at its outer edge with a series of circumferentially spaced depending flanges disposed between and engaging the inner ends of said projections, whereby the two sheet metal members of the nut are interlocked against relative rotary movement, the outer ends of said projections providing turning fingers for the nut.

11. A sheet metal nut, comprising inner and outer sheet metal members, the inner member having an internally threaded tubular portion and an outwardly extending annular top portion, the outer member having a tubular portion receiving and having a press fit connection with the tubular portion of the inner member, the outer member also having an outwardly extending annular top portion underlying and having planar contact with the top portion of the inner member, the top portion of the outer member being provided at its outer edge with a series of circumferentially spaced outwardly extending projections, and the top portion of the inner member being provided at its outer edge with a series of correspondingly spaced depending flanges, said flanges extending downwardly into the spaces between said projections and engaging said projections to interlock the two sheet metal members against relative rotary movement, the projections extending outwardly beyond said flanges and providing turning fingers for the nut.

12. A sheet metal nut, comprising a pair of sheet metal members having telescopically related inter-engaging parts and overlapping portions extending outwardly from such parts, the inner part being of tubular form and being internally threaded, the lower one of the outwardly extending portions having circumferentially spaced outwardly extending projections, and the upper one of the overlapping outwardly extending portions being provided with depending flanges extending between and engaging said projections to interlock the two members against relative rotary movement.

13. A sheet metal nut, comprising inner and outer sheet metal members, the inner member having an internally threaded tubular portion and an outwardly turned portion provided at its outer edge with circumferentially spaced outwardly extending projections, the outer member surrounding the tubular portion of said inner member and forming the outer side wall of the nut, said outer member having engagement with the tubular portion of the inner member adjacent the lower end thereof and being provided at its upper end with a series of circumferentially spaced notches receiving the projections of the inner member, whereby the inner and outer members of the nut are interlocked against relative rotary movement, the projections of the inner member extending outwardly beyond the outer side wall of the nut and providing turning fingers for the nut.

14. A sheet metal nut, comprising inner and outer sheet metal members, the inner member having an internally threaded tubular portion and an outwardly turned portion provided at its outer edge with circumferentially spaced outwardly extending projections, the outer member having an upper tubular portion surrounding the tubular portion of said inner member and forming at least a part of, the outer side wall of the nut, said outer member also having a lower portion in engagement with the tubular portion of the inner member adjacent the lower end thereof, the upper tubular portion of the outer member being provided in its upper edge with a series of circumferentially spaced notches receiving the correspondingly spaced projections of the inner member, whereby the inner and outer members of the nut are interlocked against relative rotary movement, the projections of the inner member extending outwardly beyond the upper tubular portion of the outer member and providing turning fingers for the nut.

15. A sheet metal nut, comprising inner and outer sheet metal members, the inner member having an internally threaded tubular portion and an outwardly turned annular portion provided at its outer edge with circumferentially spaced outwardly extending projections, the outer member having upper and lower tubular portions surrounding the tubular portion of said inner member and forming the outer side wall of the nut, the lower tubular portion of the outer member being in contact with the tubular portion of the inner member and the upper tubular portion of the outer member being spaced from the tubular portion of the inner member, with the consequent provision of a work-engaging shoulder between the upper and lower tubular portions of the outer member, the upper tubular portion of the outer member being provided in its upper edge with a series of circumferentially spaced notches receiving the correspondingly spaced projections of the inner member, whereby the inner and outer members of the nut are interlocked against relative rotary movement, the projections of the inner member being extended outwardly beyond the upper tubular portion of the outer member and providing turning fingers for the nut.

16. A sheet metal nut, comprising inner and outer sheet metal members, the inner member having an internally threaded tubular portion and an outwardly turned portion provided at its outer edge with circumferentially spaced outwardly extending projections, the outer member having upper and lower tubular portions, the lower tubular portion surrounding and having a press fit connection with the tubular portion of the inner member and the upper tubular portion surrounding and having a press fit connection with the outwardly turned portion of the inner member, the upper tubular portion of the outer member being provided in its upper edge with a series of circumferentially spaced notches receiving the outwardly extending projections of the outwardly turned portion of the inner member, whereby the inner and outer members of the nut are interlocked against relative rotary movement, the projections of the inner member extending outwardly beyond the upper tubular portion of the outer member and providing turning fingers for the nut.

17. A sheet metal nut, comprising inner and outer sheet metal members, the inner member having an internally threaded tubular portion and an outwardly turned portion provided at its outer edge with circumferentially spaced outwardly extending projections, the outer member having upper and lower tubular portions, the upper tubular portion receiving the outwardly turned portion of the inner member and the lower tubular portion receiving and being in engagement with the tubular portion of the inner member, the diametric variation between the upper and lower tubular portions of the outer member providing a work-engaging shoulder therebetween, the upper tubular portion of the outer member being provided in its upper edge with a series of circumferentially spaced notches receiving the correspondingly spaced projections of the outwardly turned portion of the inner member, whereby the inner and outer members of the nut are interlocked against relative rotary movement, the projections of the inner member extending outwardly beyond the upper tubular portion of the outer member and providing turning fingers for the nut.

HAROLD B. MUSTER.